United States Patent [19]

Mannatt

[11] 4,198,213

[45] Apr. 15, 1980

[54] SELF ADJUSTING OXYGEN ENRICHMENT SYSTEM

[75] Inventor: Scott A. Mannatt, Granada Hills, Calif.

[73] Assignee: The Garrett Corporation, Los Angeles, Calif.

[21] Appl. No.: 872,513

[22] Filed: Jan. 26, 1978

[51] Int. Cl.[2] ..................... B01D 59/12

[52] U.S. Cl. ..................... 55/16; 55/68; 55/158; 55/312

[58] Field of Search ..................... 55/16, 33, 68, 158, 55/309, 312; 210/321 R

[56] References Cited

U.S. PATENT DOCUMENTS

| | | | |
|---|---|---|---|
| 3,242,651 | 3/1966 | Arnoldi | 55/68 X |
| 3,256,675 | 6/1966 | Robb | 55/158 X |
| 3,369,343 | 2/1968 | Robb | 55/16 |
| 3,489,144 | 1/1970 | Dibelius et al. | 55/158 X |
| 3,775,949 | 12/1973 | Wachter | 55/312 |
| 3,786,924 | 1/1974 | Huffman | 210/321 R X |
| 3,922,149 | 11/1975 | Ruder et al. | 55/25 X |
| 3,930,814 | 1/1976 | Gessner | 55/68 X |

*Primary Examiner*—Robert H. Spitzer

*Attorney, Agent, or Firm*—Joel D. Talcott; Albert J. Miller

[57] ABSTRACT

A self adjusting system automatically provides oxygen enriched breathing air at flow rates and oxygen concentrations sufficient to prevent hypoxia at high cabin altitudes.

14 Claims, 3 Drawing Figures

SELF ADJUSTING OXYGEN ENRICHMENT SYSTEM

This invention relates to breathing oxygen supply systems and, more particularly, to a system which can be relatively small and lightweight and provides oxygen enriched air to occupants of a vehicle such as an airplane, the flow rate and oxygen concentration of the breathing air being automatically adjusted to be sufficient to prevent hypoxia under elevated cabin altitude conditions.

At or near sea level, an airplane can be operated safely with its occupants breathing ambient composition air. However, due to reduction of oxygen partial pressure at increased altitudes, beginning at about 10,000 feet, adverse physiological symptoms of hypoxia occur if ambient pressure air is breathed unless this air is enriched in oxygen concentration. Unless prevented by increasing the air pressure or the breathing of oxygen-enriched air, the symptoms of hypoxia increase in severity with altitude and include a loss of peripheral and night vision, decreased reaction time, impaired judgment, and finally lack of useful consciousness. Since one way to prevent the reduction of oxygen partial pressure is to maintain the local environmental pressure at a level greater than ambient pressure, many aircraft utilize a pressurized cabin to eliminate or diminish the effects of hypoxia at high altitude. However, due to the structural penalties imposed, many aircraft either are not designed to operate with a pressurized cabin or may not pressurize the airplane cabin to a sufficient level to maintain cabin altitude below 10,000 feet at high aircraft altitudes. Accordingly, some additional means must be provided to boost the percentage of oxygen in the air from its ambient 21% level so that a sufficient supply of oxygen will be available to all occupants of the aircraft.

One means to provide this oxygen is by storing an oxygen supply within the vehicle. This may be in the form of pressurized oxygen gas, cryogenic liquid oxygen, or a chemical oxygen generation system. The oxygen may then be fed directly to breathing masks or other suitable equipment or mixed with ambient air to provide an oxygen augmented product. Such systems can provide oxygen only to the extent it has been stored in the vehicle and an adequate supply may require significant use of available weight and volume. In addition, particularly where aerial refueling is used, the exhaustion of the stored breathing oxygen supply may require termination of the flight before it would otherwise be necessary to do so.

Substantial reduction of weight and volume in oxygen systems may be accomplished by utilizing oxygen enrichment systems. These systems, exemplified by Niedzielski et al, U.S. Pat. No. 3,307,330; Dibelius et al, U.S. Pat. No. 3,489,144; Blackmer et al, U.S. Pat. No. 3,976,451; and Ruder et al, U.S. Pat. No. 3,922,149, utilize either ram air or bleed air from a turbine engine. This air is separated into an oxygen rich stream for breathing and an oxygen depleted stream.

Prior art systems commonly face the problem of structuring the unit to be functional over a wide range of cabin altitude. As altitude increases, the air pressure and density of the air decreases while the volume of air consumed (inspired breathing) remains substantially the same. As the total air pressure is reduced, the partial pressures of air's constituent gases, including oxygen, are proportionally reduced. Thus, while the same volume of air will be inhaled at all altitudes, the partial pressure of oxygen in this air will diminish as altitude increases unless the breathing air has been supplemented with additional oxygen. As a result, it is necessary that the percentage of oxygen in the air be greater for higher cabin altitudes and that the mass flow rate be sufficiently high to accommodate low altitude needs. These requirements have heretofore necessitated the use of a large unit capable of a high percentage oxygen enrichment (over 60% at 25,000 feet cabin altitude) and high mass flow rate (typically about 2.3 lb/hr-man at sea level). Great volume and weight penalties must be paid for such a system. However, the only alternative available for prior art systems have been complex and costly systems for varying enrichment and flow rates with variations in cabin pressure.

In accordance with this invention, a system for supplying breathable air is provided and automatically adjust the flow rate and oxygen percentage of breathing air in accordance with variation in cabin pressure. The system is capable of maintaining the partial pressure of oxygen in the breather's lungs at or above the level normally provided at sea level without the use of complex regulating equipment.

Pressurized air from turbine engine compressor bleed or other suitable pressure source is fed to an oxygen enrichment system which is constructed to produce a constant mass flow at a concentration of oxygen equal to that required at its highest design level of cabin altitude (lowest cabin pressure). A bypass is provided to blend pressurized inlet air with the constant output of the oxygen enrichment devices so that at lower altitudes where there is a demand for a greater mass of air, the constant output of the oxygen enrichment devices is mixed with pressurized inlet air having ambient oxygen concentration to produce an air mixture having an oxygen concentration appropriate for each altitude.

The advantages of this invention will be best understood when the specification is read in conjunction with the appended drawings, wherein.

Figure 1:
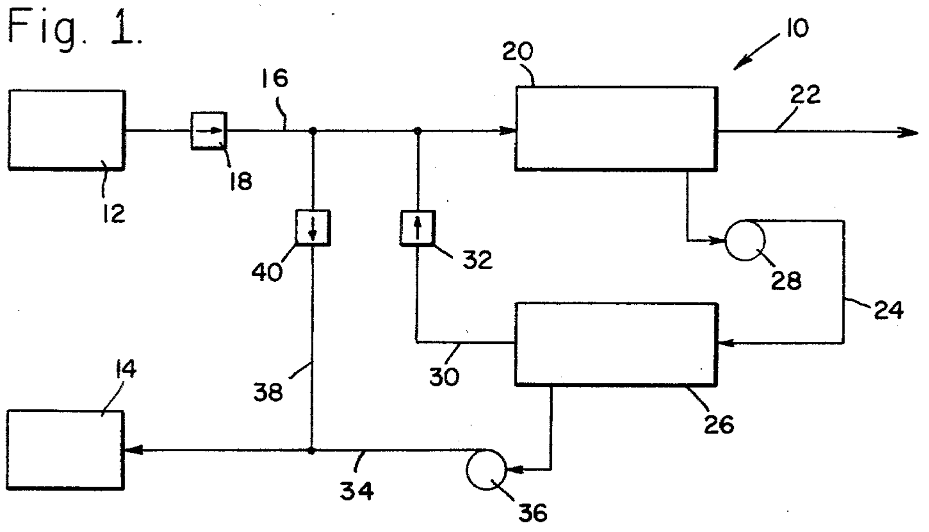
FIG. 1 is a schematic diagram of an automatically adjustable oxygen enrichment system in accordance with this invention.

Referring now to the drawings, FIG. 1 illustrates an oxygen enrichment system 10 in accordance with this invention which receives conditioned air from a suitable pressurized source, such as bleed air from a turbine engine 12. The system increases the air's oxygen content and feeds the enriched product to suitable breathing apparatus 14, such as an oxygen regulator, an oxygen mask, a pressure suit, or a pressurized cabin.

Bleed air from the engine 12 is fed through a suitable conduit 16 to the inflow of a first enrichment stage 20. A check valve 18 may also be used to prevent undesired air flow from the enrichment system 10 back into the bleed air system. This may be one of a number of well known devices including those utilizing permeable polymeric membranes and hollow fibers for the separation of oxygen from nitrogen in an air stream. Such devices are well known to those skilled in the art and examples are disclosed in Gerow, U.S. Pat. No. 3,832,830 and Mahon, U.S. Pat. No. 3,228,877. Also, other types of enrichment systems, such as those utilizing spiral wound membranes or thin film membranes may be used.

An oxygen depleted stream is separated in the first enrichment stage and is transmitted through a conduit 22 to be exhausted overboard at a controlled rate while maintaining source air pressure. Alternatively, this stream may be utilized as part of a nitrogen enrichment system to provide oxygen depleted gas for fuel tank inerting in a well known manner.

An oxygen rich stream is fed from the first enrichment stage 20 through a conduit 24 to a second enrichment stage 26. An interstage compressor 28 is preferably used to boost the pressure of the gas for more effective enrichment by the second stage 26.

The oxygen depleted stream from the second enrichment stage passes through a conduit 30 and check valve 32 to be returned into the conduit 16 wherein it mixes with air from the engine 12 for recirculation through the first enrichment stage 20. While the oxygen depleted gas from the second stage 26 may be dumped overboard, it may have a higher oxygen content than that of the ambient pressurized air and it is then desirable that it be recirculated to enhance the operation of the oxygen enrichment system.

The oxygen rich stream is fed through a conduit 34 to the breathing apparatus 14. A boost compressor 36 is preferably used to provide any increase in pressure required to feed the enriched product in a manner suitable for comfortable breathing.

Such a system will provide an adequate supply of oxygen enriched air suitable for breathing even at high altitudes. If desired, for example, the system can be structured to produce an oxygen enriched product at conduit 34 which is about 70 percent oxygen, quite suitable for breathing at a cabin altitude of 25,000 feet where an oxygen concentration somewhat in excess of 60 percent is required to establish near sea level oxygen partial pressure in the lungs.

The characteristics of breathing physiology which require oxygen to be enriched produces a problem in construction and control of an enrichment system. At lower altitudes when the atmospheric pressure is greater, density is correspondingly greater. Thus, a lung that is full of air contains a greater mass of air at lower altitudes than at higher altitudes. Any oxygen enrichment system must be constructed to provide a sufficient mass of air for breathing at all altitudes at which it is to be operated. If it were required that a 70 percent enriched air supply be available at the air production rate required at low altitude, an extremely high capacity system would be required for which a high penalty of weight and volume would have to be paid.

In accordance with this invention, the oxygen enrichment system 10 is structured to produce adequate quantities of suitably enriched air through the full operating range of cabin altitudes while minimizing the necessary weight and volume of equipment by the use of a simple automatic adjustment feature. This is provided by connecting a conduit 38 and check valve 40 between conduit 16 and conduit 34 to transfer pressurized air from the source of pressurized air 12 directly to the breathing apparatus 14. This is ambient air having a normal 21 percent oxygen concentration. While the conduit 38 is shown connected to the same source as that used for the oxygen enrichment system 10, any suitable source may be used.

The 70 percent oxygen enriched product fed from the boost compressor 36 into conduit 34 is processed at a constant rate and yields a constant mass flow. Thus, regardless of cabin pressure, the mass of enriched air produced per unit time will be constant. For example, 70 percent enriched air may be produced by the two stage system shown in FIG. 1 at a rate of 0.7 lb/hr-man. This flow rate would be suitable at an altitude of 25,000 feet. At lower cabin altitude where atmospheric pressure is greater and the density of air is correspondingly increased, breathing demand will require a greater mass flow of air to be supplied. Because the output of the boost compressor will remain constant, additional air will be drawn directly from the source of pressurized air through conduit 38 in accordance with demand to provide a sufficient mass of air to the breathing apparatus 14. Inasmuch as the tubine engine 12 is capable of providing bleed air to the enrichment system 10 at a rate much greater than it is capable of using, the air drawn through the conduit 38 will in no way detract from the operation of the first and second enrichment stages 20 and 26.

By mixing the 70 percent oxygen enriched air with 21 percent oxygen bleed air, the percentage of oxygen provided to the breathing apparatus 14 will be enriched at intermediate altitudes by an amount less than the full enrichment capacity of the system. However, this will be more than adequate to provide sufficient oxygen at all altitudes.

Figure 2:
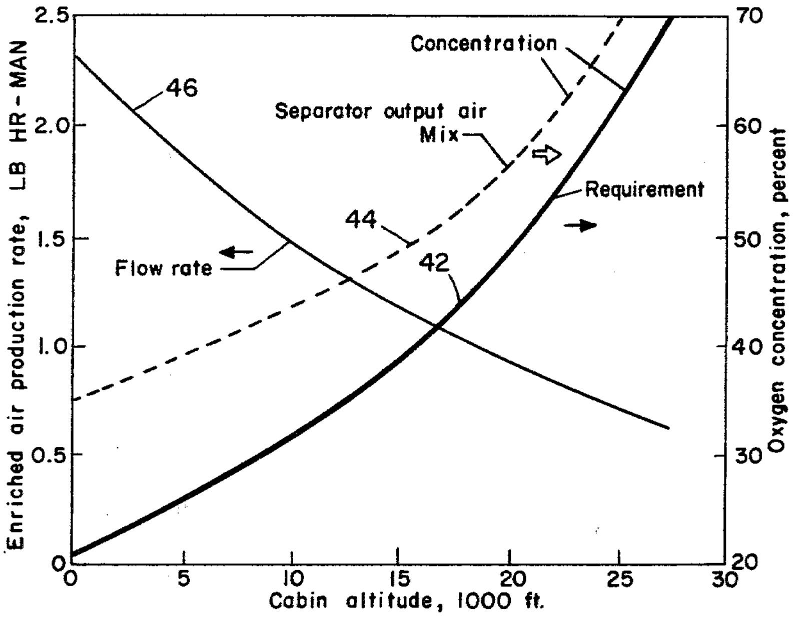
FIG. 2 is a graph illustrating operation of the oxygen enrichment system of FIG. 1.

Referring to FIG. 2, curve 42 exemplifies the physiological requirement of an individual for the oxygen concentration of air in accordance with changes in altitude, percent oxygen concentration being plotted on the right vertical axis against cabin altitude on the horizontal axis. Curve 44 illustrates a typical range of oxygen concentration for the oxygen enrichment system of this invention when set to produce an oxygen concentration of 70 percent at a cabin altitude of 25,000 feet. As can be seen, the oxygen enrichment percentage provided to the breathing apparatus at all altitudes is at least equal to the enrichment requirements to prevent the physiological symptoms of hypoxia.

Flow rate to the breathing apparatus 14 is shown by curve 46. As can be seen, flow rate increases as cabin altitude decreases to the extent required by the additional capacity of the lung for mass flow at the greater air densities. At a cabin altitude of 25,000 feet, it is sufficient for the system to produce only enriched air at its full capacity at a rate, in this example, of about 0.7 lb/hr. As cabin altitude decreases, this will be mixed with bleed air to increase the flow rate to about 2.3 lb/hr at sea level where the breathing apparatus will receive a mixture having an oxygen concentration of about 35 percent.

As can be seen, the oxygen enrichment system of this invention provides sufficient mass flow of air for breathing at all design altitudes for an aircraft while providing sufficient oxygen concentration for breathing throughout this range. All this is accomplished with a minimum size and weight system and without the use of complex controls.

Figure 3:
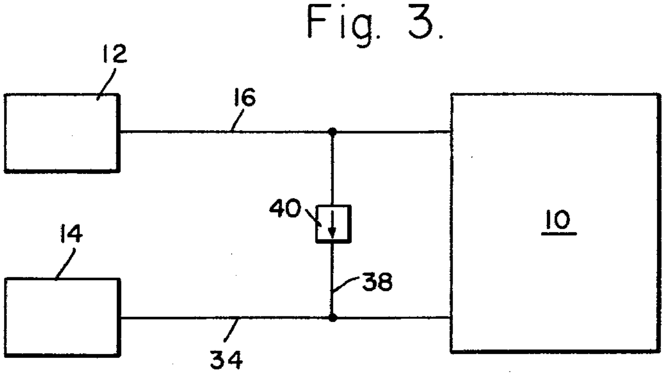
FIG. 3 is a schematic diagram similar to FIG. 1 further illustrating the invention.

While the invention has been described with respect to a particular two stage oxygen enrichment system 10, as will be seen in FIG. 3, the invention may be practiced with an oxygen enrichment system which may be single stage or multiple stage and utilized not only hollow fibers of various materials but spiral wound membranes, film membranes or any other enrichment device capable of producing a rate of oxygen enrichment sufficient for breathing at the minimum cabin pressure for which this system is to be utilized. The oxygen enrichment system 10 need only be connected to the source of pressurized air 12 to obtain such air through conduit 16 and connected to the breathing apparatus 14 to pass enriched air thereto through conduit 34. It is then only necessary to connect the breathing apparatus separately to the source or pressurized air 12 with a suitable device 40 interposed to provide suitable pressure and flow characteristics, or to a separate source of pressurized air, so that at altitudes below the maximum design altitude of the oxygen enrichment system 10, additional mass flow needs may be provided by the source of pressurized air in accordance with the demand rate for the breathing apparatus 14.

I claim:

1. In a vehicle for operating over a range of altitudes including a maximum altitude, an improved breathing apparatus comprising:
   - a source of pressurized air on said vehicle;
   - enriching means for receiving said pressurized air and increasing its oxygen concentration to a preselected percentage at a generally fixed mass flow rate sufficient for breathing at said maximum altitude;
   - breathing means for receiving air from said enrichment means for use at a demand mass flow rate which varies with changes in altitude of said vehicle; and
   - supply means for providing additional air to said breathing means at reduced altitudes less than said maximum altitude to the extent said demand mass flow rate exceeds said fixed mass flow rate and with a reduced oxygen concentration sufficient for breathing at said reduced altitude.

2. Breathing apparatus as in claim 1 wherein said supply means comprises bypass means for directing pressurized air to said breathing means from said source.

3. Breathing apparatus as in claim 2 wherein said bypass means includes a check valve for permitting flow only from said source to said breathing means.

4. Breathing apparatus as in claim 1 wherein said supply means comprises means for providing pressurized air to said breathing means.

5. A self-adjusting oxygen enrichment system in a vehicle which operates over a range of altitudes, a maximum altitude of said range having a corresponding minimum atmospheric pressure, said system producing air suitable for breathing at pressures equal to or greater than said minimum pressure and comprising:
   - enriching means for generating air at a mass flow rate and oxygen concentration suitable for breathing at said minimum pressure; and
   - means for permitting addition of pressurized air to air from said enriching means at pressures greater than said minimum pressure for providing a sufficient mass flow rate and oxygen concentration for breathing at said pressures greater than said preselected pressure.

6. A self adjusting oxygen enrichment system as in claim 5 including a source of pressurized air on said vehicle, and wherein said enriching means comprises means for receiving pressurized air from said source and increasing oxygen concentration of said air.

7. A self adjusting oxygen enrichment system as in claim 6 wherein said pressurized air addition means comprises bypass means for receiving air from said source for mixture with said air from said enriching means.

8. A self adjusting oxygen enrichment system as in claim 7 wherein said bypass means includes a check valve for preventing air flow toward said source.

9. In a vehicle which operates over a range of altitudes, with atmospheric pressure in said vehicle reducing as altitude increases, reaching a minimum pressure at a maximum altitude of said vehicle, a system for preventing hypoxia at atmospheric pressures down to said minimum pressure, said system comprising:
   - a source of pressurized air on said vehicle;
   - breathing air supply means;
   - enriching means for receiving pressurized air from said source and increasing its oxygen concentration to a level sufficient to prevent hypoxia at said minimum pressure and supplying enriched air to said breathing air supply means at a mass flow rate sufficient to satisfy breathing demand at said minimum pressure and maximum altitude; and
   - bypass means for directing air flow from said source to said breathing apparatus as required to satisfy breathing demand while maintaining oxygen concentration at a level sufficient to prevent hypoxia when combined with said enriched air at reduced altitudes and corresponding atmospheric pressures greater than said minimum pressure.

10. The system of claim 9 wherein said breathing air supply means comprises a pressurized cabin of said vehicle.

11. The system of claim 9 wherein said breathing air supply means comprises a pressure suit.

12. The system of claim 9 wherein said breathing air supply means comprises a face mask.

13. The system of claim 9 wherein said bypass means includes a check valve for preventing flow toward said source.

14. A method of supplying air, with an oxygen level sufficient to prevent hypoxia and at mass flow rates sufficient to satisfy breathing demand in a vehicle which operates over a range of altitudes up to a maximum altitude with a corresponding range of atmospheric pressures down to a minimum pressure, to breathing air supply apparatus with a substantially constant volume demand for breathing air, said method comprising the steps of:
   - supplying pressurized air from a source on said vehicle to an enrichment system;
   - enriching the oxygen content of said pressurized air to a level sufficient to prevent hypoxia at said maximum altitude and minimum pressure;
   - supplying said enriched air to said breathing apparatus at a rate sufficient to satisfy breathing demand at said minimum pressure; and
   - adding pressurized air to said breathing apparatus as required to satisfy said fixed volume breathing demand while maintaining the oxygen content at a level sufficient to prevent hypoxia when combined with said enriched air at reduced altitudes and atmospheric pressures greater than said minimum pressure.

* * * * *

UNITED STATES PATENT AND TRADEMARK OFFICE

CERTIFICATE OF CORRECTION

PATENT NO. : 4,198,213

DATED : April 15, 1980

INVENTOR(S) : Scott A. Manatt

It is certified that error appears in the above-identified patent and that said Letters Patent are hereby corrected as shown below:

The correct spelling of the inventor's name is

Scott A. Manatt

Signed and Sealed this

*Fifth* Day of *August 1980*

[SEAL]

*Attest:*

SIDNEY A. DIAMOND

*Attesting Officer*

*Commissioner of Patents and Trademarks*